Dec. 15, 1970   R. W. ASTHEIMER   3,548,194
SENSOR FOR DETECTING THE ATTITUDE OF AN AERIAL
VEHICLE WITH RESPECT TO THE LOCAL VERTICAL
Filed Feb. 26, 1969   4 Sheets-Sheet 1

INVENTOR.
ROBERT W. ASTHEIMER
BY
Robert Cuner

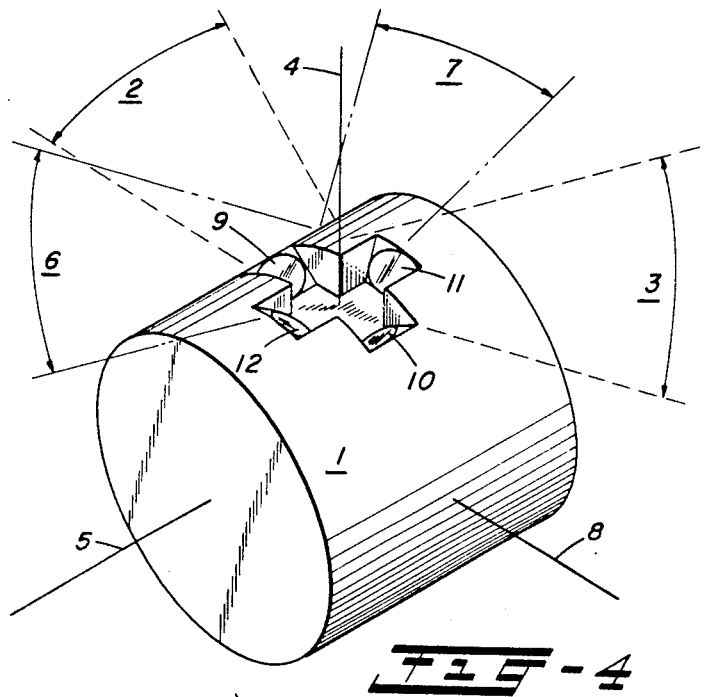
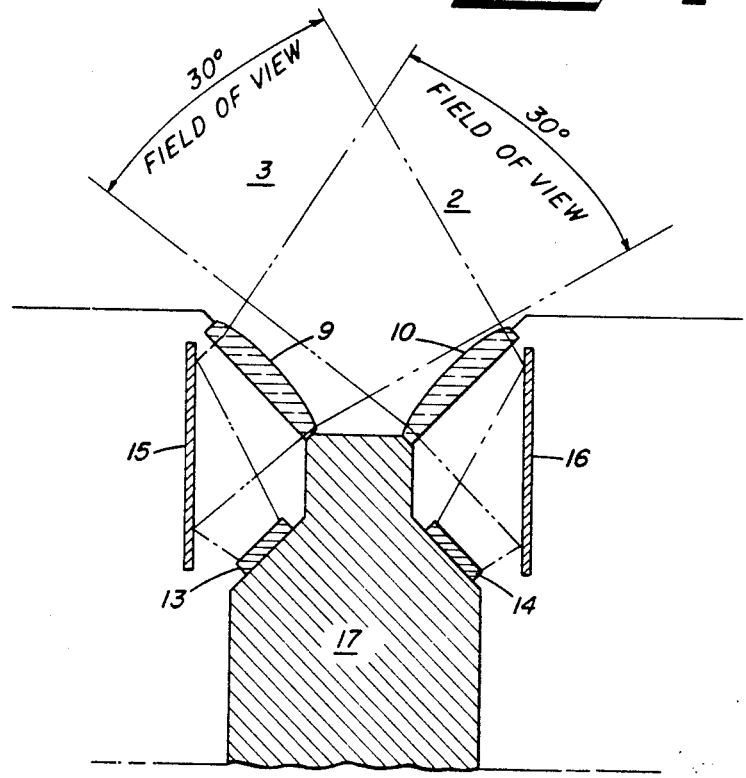

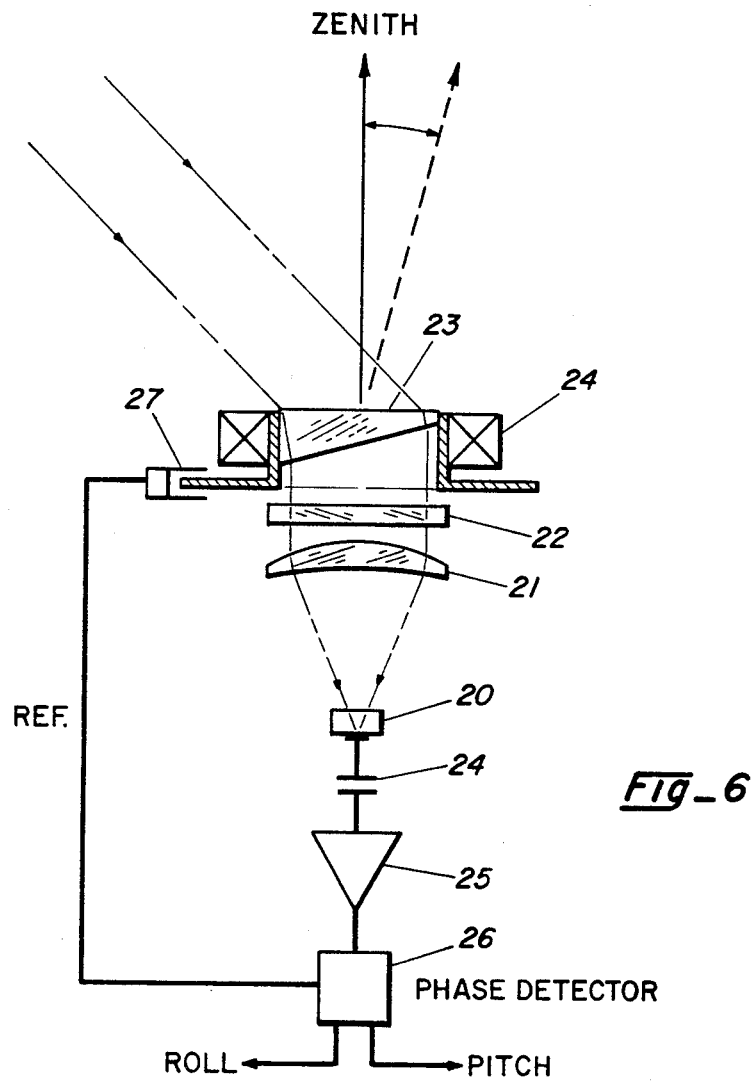
*Fig_6*
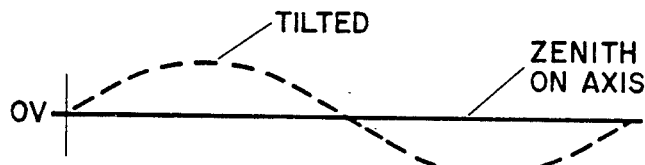
*Fig_7*

United States Patent Office 3,548,194
Patented Dec. 15, 1970

3,548,194
SENSOR FOR DETECTING THE ATTITUDE OF AN AERIAL VEHICLE WITH RESPECT TO THE LOCAL VERTICAL
Robert W. Astheimer, Westport, Conn., assignor to Barnes Engineering Company, Stamford, Conn., a corporation of Delaware
Continuation-in-part of application Ser. No. 564,521, July 8, 1966. This application Feb. 26, 1969, Ser. No. 805,991
Int. Cl. G01p *13/00*
U.S. Cl. 250—83.3                  7 Claims

ABSTRACT OF THE DISCLOSURE

An attitude sensor mounted on the top of a high-flying airplane determines whether the airplane is in level flight with respect to the local vertical through the zenith, and produces signals indicating departure about either roll or pitch axes, and the direction. Preferably pairs of detectors are provided symmetrically arranged with respect to the two axes, and looking up at an angle with the horizontal. The detectors are sensitive only to radiation from the 15μ carbon dioxide band, or rather to a band about the radiation maximum, and therefore unaffected by temperature differences on the earth's surface, such as sheets of ice and the like, or cold clouds near the horizon. Instead of having pairs of detectors, a single detector can be scanned conically in a cone centered on the local vertical with its base up toward the zenith. When scanning, suitable electronics of conventional design are used.

RELATED APPLICATIONS

This application is a continuation-in-part of my earlier copending application Ser. No. 564,521, filed July 8, 1966, and now abandoned.

BACKGROUND OF THE INVENTION

Simplified horizon sensors for high-flying aircraft have been developed which are of the radiation-balance type, and which comprise three or four infrared radiation detectors symmetrically distributed with respect to pitch and roll axes of the vehicle in which they are mounted. Each detector has a field of view extending in the vertical direction about 90° with a much narrower horizontal field which may be about 30°. The sensor body itself is in the form of a short cylinder, each radiation detector looking out horizontally and hence having a field of view which permits it to see the earth and its horizon. One pair of fields of view are symmetrical with respect to the roll axis, for example 45° either side, and a third is similarly disposed with respect to the pitch axis. When the attitude of the vehicle, for example a high flying airplane, corresponds with level flight, with the local vertical from the center of the earth perpendicular to the roll and pitch axes, all three sensors will view the same proportion of earth and space, and so each will put out the same electrical signal from its infrared detector. It should be noted that as the altitude of the vehicle changes, so will the proportion of earth viewed and space viewed by each detector. In other words, the absolute value of the detector signal will change, but it will be the same for all three detectors in level flight. Amplifying and electronic processing circuits receive the signals from the detectors, and put them out in opposition. Hence, if the signals are the same in all three detectors, there will be a zero D.C. voltage between the two detectors about the roll axis, and correspondingly the two detectors about the pitch axis. Since the detectors are symmetrical, one of them is involved in each of these relationships. If the vehicle attitude changes about either or both of the axes, there will be a D.C. voltage between one or both pairs of detectors which corresponds to the degree of tilt with respect to the axes. These signals may be used to signal to a pilot whether his attitude has changed with respect to either or both of the axes.

A serious problem has arisen with sensors, whether of the scanning or radiation balance type, because cold clouds at or near one or more portions of the horizon within the field of view of one or more detectors will cause the detectors to put out differing signals even when the attitude of the vehicle is perfectly level. In other words, the effect of these clouds is to give a spurious reading which is interpreted as tilt about one or more axes even though the airplane is flying level. Other thermal differences at the various points of the horizon will have a similar effect, such as, for example, a glacier which is at one point of the horizon within the field of view of one of the detectors, but which does not have such great extent that it is simultaneously in the field of view of the other two detectors, or of one of them. Similarly, other sharp differences in temperature, for example local sun illuminated patches such as arid patches which heat up more, can also contribute spurious results. The presence of cold clouds is, however, the most common cause of spurious results, and in the further discussion, the effect of cold clouds will be primarily discussed as a typical illustration of the problems encountered.

An important advance in accuracy of conical scan and similar scanning horizon sensors was achieved by limiting infrared detectors of the scanning sensors to radiation from a gaseous constituent of the earth's atmosphere, such as, for example, the 15μ $CO_2$ band. These improved scanning horizon sensors form the subject matter of U.S. patent to Kaufman, No. 3,118,063, Jan. 14, 1964. Scanning sensors utilizing the principles of the Kaufman patent have proven very successful, and are insensitive to the presence of cold clouds. However, they operate on the basis of scanning across a thermal discontinuity, and the carbon dioxide band is not useful with the type of horizon sensors described above where the sensor is within the atmosphere, as the atmosphere would appear opaque and the horizon from the comparatively low altitude of a high-flying airplane would be obscured and hence no sensed information could be obtained with respect to vehicle attitude.

SUMMARY OF THE INVENTION

The present invention, which relates to a combination of an airplane with a special type of local vertical sensor, solves the problem of spurious responses in radiation balance and other types of local vertical sensors for the relatively low altitudes involved with high flying airplanes. These are usually in the stratosphere, but not too far from the tropopause. A typical flight altitude may be about 15 km. and the quantitative data of the present invention, which will be described specifically for a radiation balance type sensor in an illustrative example below, are based on such an altitude. Instead of having the field of view such that it sees the horizontal, the field of view of each infrared detector is tilted up, for example about 45°, so that it cannot see the horizon, and instead of utilizing a narrow band at the radiation maximum for emission from the gas, a wider band is used. This will be brought out in connection with the drawings.

Instead of paired detectors of the radiation balance type, a detector can be scanned in a cone centered about the local vertical with the base of the cone toward the zenith. Suitable conventional electronics give signals of departure from level flight about either or both orthogonal axes.

The present invention operates by reason of the fact that the distribution of carbon dioxide is substantially constant throughout the atmosphere, and that its temperature, while varying with latitude, does not vary for the small difference of latitude which is represented by the fields of view.

It will be noted that the sensor always looks out above the horizontal because it is combined with the airplane and mounted on the top of the plane, or looking out through a window on the top of the plane. This combination makes it impossible for the sensor to see the earth or the earth's horizon at any time when the airplane is flying right side up, which is of course the normal flight path and the condition during which the present combination of airplane and sensor operates. The construction of the airplane of course forms no part as such of the present invention, except that the sensor is mounted on the top of the plane or looking out through the top.

BRIEF DESCRIPTION OF THE DRAWINGS

FIG. 4 is an elevation looking down on the sensor package;

FIG. 5 is a section through one pair of sensors;

FIG. 6 is a diagrammatic view of a scanning detector instrument; and

FIG. 7 is a representation of signal output voltages for two different positions.

DESCRIPTION OF THE PREFERRED EMBODIMENTS

Figure 1:
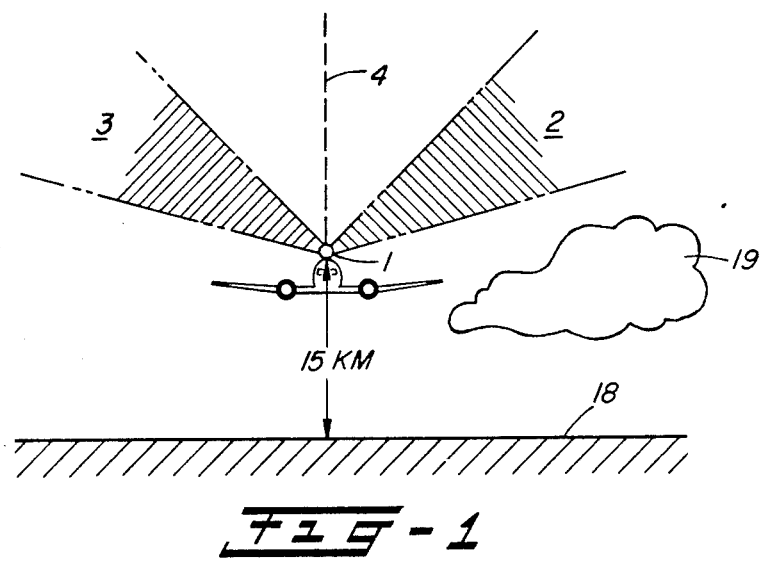
FIG. 1 is a diagrammatic representation of an airplane with a radiation balance type sensor mounted on top of the plane so that the fields of view for a pair of radiation detectors of the sensor are symmetrically distributed about the roll axis of the vehicle.

FIG. 1 shows diagrammatically a combination of an airplane 28 having mounted on or at the top surface of the fuselage a vertical sensor 1. The sensor is actually in the form of a short cylinder with a shape resembling that of a hockey puck on edge, the orientation being so that the roll axis of the airplane is at right angles to the plane of the paper. As the figure is diagrammatic, the end of the sensor appears only as a circle. The fields of view, each about 30°, are shown at 2 and 3, being tilted up from the horizontal, and being symmetrically distributed about the roll axis of the vehicle. FIG. 1 shows the vehicle flying level as far as the roll axis is concerned, at a height of about 15 km., the local vertical being represented by the dashed line 4. The earth's surface can be seen at 18 with a cold cloud 19.

In an actual sensor, for example as shown in FIG. 4 and described below, there are another pair of detectors with fields of view tilted up and symmetrically distributed about the pitch axis of the vehicle, which is, of course, at right angles to the roll axis. These fields of view, of course, do not appear in FIG. 1.

Figure 2:
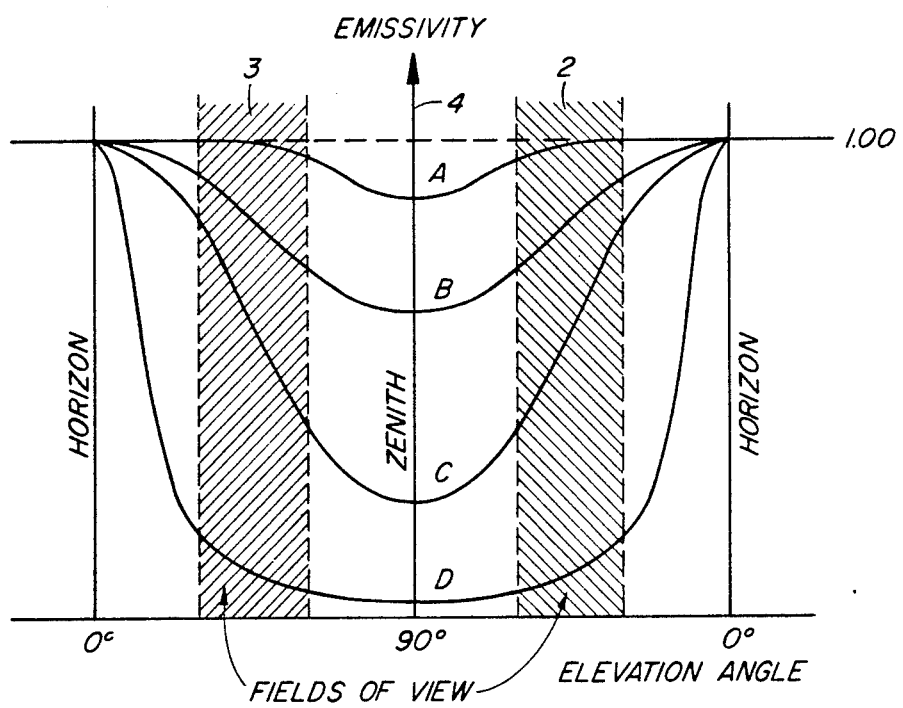
FIG. 2 is a diagram of the emission or absorption of the carbon dioxide at different angles of elevation about the horizon.

The operation of the present invention utilizes the fact that the path length through the atmosphere for a given degree of absorption depends on the wavelength band of the sensors. If this band is very near to the approximate wavelength, $15\mu$, of the carbon dioxide band, quite a short path will result in complete absorption, that is to say, beyond the path length, further molecules of carbon dioxide do not contribute any radiation reaching the sensor because it is absorbed by the molecules in the path length. At the 15 km. altitude this path length for complete absorption is 10 km. or less, and therefore the emissivity is substantially 1.0 regardless of which direction the sensors are looking. In other words, even if they were looking straight up, there would still be sufficient path length for there to be enough carbon dioxide molecules so that complete absorption would be reached. This is shown in FIG. 2, which plots emissivity as the ordinate against elevation angle from the horizontal as the abscissa. The narrow band near the carbon dioxide absorption appears as a straight line, the center being shown dashed, and the two 30° fields of view 2 and 3 being represented by shaded areas. Such a narrow band is useless for the present invention, as it will give substantially the same response in the two detectors regardless of whether their angle of elevation from the horizontal varies from 0 to 90. In other words, response would be exactly the same if the vehicle were tilted about the roll axis, one field of view looking rather steeply up and the other looking out horizontally or even somewhat down.

Figure 3:
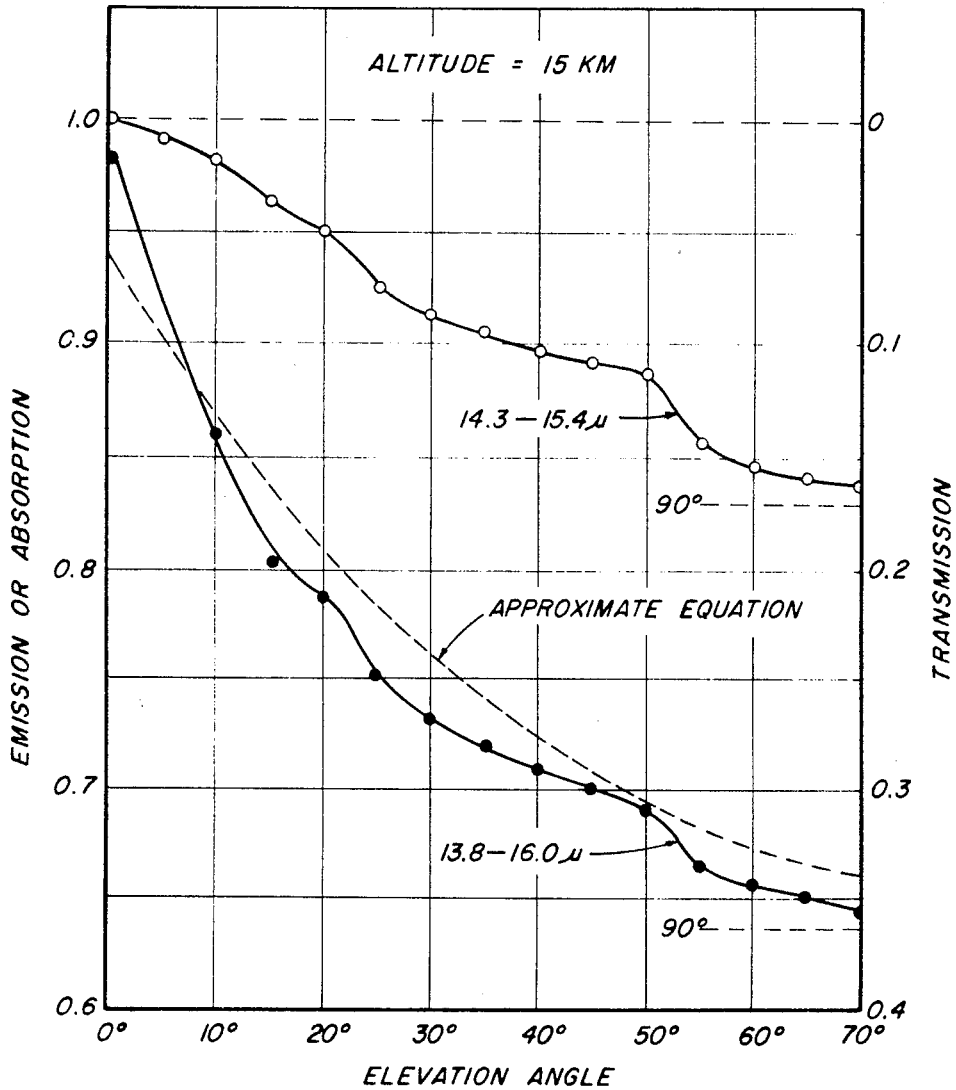
FIG. 3 is a set of curves for detector combinations having different band-width response and an equation approximating the curve for one of them.

As the band is widened from the absorption maximum for the carbon dioxide band, the path length for total absorption becomes greater and greater, and as a result, looking straight up toward the zenith, the path length exceeds the effective height of the atmosphere and the cold of outer space is observed by the instrument; in other words, in this band width the carbon dioxide molecule emissivity is less than 1. As the band width becomes greater and greater, the shape of the curves corresponds to curves A, B, C and D in FIG. 2. Finally the band width is so broad that a curve D is approached in which there is practically no absorption, viewing vertically toward the zenith. A practical compromise has to be reached which does not see the earth itself, as is the case for curve D, but which gives a significant change in signal with viewing angle. A response like curve B or C is preferred. FIG. 3 shows plots for elevation angles from 0 to 70°, with an indication of the emissivity at 90° in a dashed line, for two band widths, first $14.3-15.4\mu$. This corresponds to band A of FIG. 2 and shows too flat a slope to give the desired amount of sensitivity to the sensors. A band width of $13.8-16.0\mu$, which corresponds more nearly to curve B on FIG. 2 is about right, and represents a favorable compromise between sensitivity to variations in tilt of the vehicle and amount of energy available. This is not to say that there is any particular magic in the exact band width. It is shown as a very satisfactory one, but band widths somewhat wider or somewhat narrower are quite useful. But for the remainder of the specific description this typical illustrative example will be referred to.

It will be apparent from FIG. 1 that at the 15 km. altitude a cloud 19 would not be seen at all except in the case of an excessive tilt about the roll axis. At somewhat lower altitudes the invention still works satisfactorily because a cloud would have to be both very high and very near the aircraft to be perceived when the vehicle is in level flight.

Let us assume that the vehicle rolls to the left. In this case, field of view 2 would have a higher elevation angle from the horizontal and field of view 3 a lower one. It will be apparent that the radiation striking the detector having field of view 3 will be increased, whereas that receiving radiation from field of view 2 will have a lesser response and when the detectors are connected in opposition, as in any horizon sensor, a difference in D.C. signal will be produced, the magnitude of which is a function of the degree of tilt and the polarity of which determines the direction of tilt.

Looking at FIG. 4, the two detector fields of view 2 and 3 which in level flight are symmetrical to the roll axis 5 will determine roll, whereas another pair of fields of view 6 and 7, which are symmetrically positioned with respect to the pitch axis 8 in level flight, will give signals indicating tilt degree and direction about the pitch axis. FIG. 4 shows the fields of view produced by crossing the detectors looking through lenses 9 and 10 for reasons which will be apparent from a description below of an actual structure in connection with FIG. 5. A similar crossing holds true for fields of view 6 and 7 coming from lenses 11 and 12.

FIGS. 4, 5 and 6 show the sensor only, in order not to confuse the drawing. The sensors are of course mounted on or at the top surface of the airplane fuselage exactly as shown in FIG. 1, and of course when the airplane is flying normally, right side up, neither type of sensor can see either the earth or the horizon.

One pair of sensors is shown in FIG. 5, namely those of the two fields of view 2 and 3, each being approximately 30°. The two fields of view are produced by the lenses 9 and 10 in conjunction with infrared detectors, such as for example thermopiles 13 and 14. Plane mirrors 15 and 16 cause the fields of view to cross, which is the reason for this representation in FIG. 4. Looking at the cylindrical body, it will be seen that the diagrammatic showing in FIG. 1 does not illustrate the actual construction in which radiation is folded so that the directions cross to the two detectors. As far as the operation of the fields of view in the air is concerned, the diagrammatic showing in FIG. 1 is of course correct.

The main body of the sensor is provided with a suitable heat sink 17 which is in heat exchanging relation with the reference or cold junctions of the thermopiles through paths of adequately low thermal impedance. The physical construction of the thermopile and heat sink is a conventional one, and as it is not changed by the present invention, it is not illustrated in detail, since the exact mechanical construction forms no part of the present invention. Also, the standard electronics receiving differential signals from the two thermopiles are not shown, as they, too, are of standard design, and can be incorporated in the main body of the sensor in the usual manner.

Some discussion of quantitative sensitivity of the instrument is desirable, and for this purpose band B of FIG. 2, or the lower curve or bandwidth 13.8–16.0μ of FIG. 3 will be chosen. In the latter figure the curve through actual measured points for different elevation angles is portrayed in solid lines, with measured points indicated by crosses. The curve is very close in its general nature to an approximate equation the curve of which is shown in dashed lines on FIG. 3, whose equation, Eq. 1, is as follows:

(Eq. 1)      $E = (10)^{-5}(\theta)^{2.28} + 0.65$ where $E$ = Emissivity (absorption)
$\theta$ = Zenith angle in degrees The equation has no thoretical significance, and is merely a convenient equation which approximates the accurate measured points in a form which lends itself to simplified mathematical treatment as will be shown.

(Eq. 2)
$$H = N\Omega \frac{\int_{\theta_1}^{\theta_2} E d\theta}{(\theta_2 - \theta_1)}$$

Eq. 2 represents a calculation for radiation density H at the aperture which is the product of the solid angular field of view $\Omega$ and the black body radiance of air N. The equation assumes that the air temperature is uniform and shows that the signal depends only on the zenith angle $\theta$. It should be noted that this is the zenith angle and not the elevation angle from the horizon as is shown in FIGS. 2 and 3. It is, of course, the complement of this angle.

In order to evaluate the sensitivity to roll or pitch, the derivative of H with respect to $\theta$ must be determined, and this is shown by Eq. 3:

(Eq. 3)  $\frac{dH}{d\theta} = \frac{N\omega}{(\theta_2-\theta_1)} \frac{d}{d\theta} \int_{\theta_1}^{\theta_2} E d\theta = \frac{N\Omega(E_2 - E_1)}{(\theta_2 - \theta_1)}$ Referring to FIG. 2, a field of views of 30°×30° (~0.25 steradian) extending from zenith angles of 50° to 80° appears suitable. With these limits $E_1 - E_2$ is computed from Eq. 1 to be 0.15. The air temperature of the stratosphere is about 230° K. and the radiance at this temperature in the 13.8 to 16.0μ band is 500 μwatts/cm.²-ster. From Eq. 3 the change in radiation density due to a 1° roll will then be:

$$\frac{dH}{d\theta} = \frac{500 \times 0.25 \times 0.15}{30°} = 0.63 \; \mu\text{watts/cm.}^2\text{-degree}$$

If we use a 308 element thermopile detector, which is 5 x 5 mm. in size, the focal length of the lens must be 10 mm. in order for the detector to subtend 30°. Using an F/1.0 system the lens diameter becomes 10 mm. This detector with bismuth-antimony elements has a specific responsivity R' of 0.18 volts/watt/cm.². The voltage signal developed will then be:

$$\frac{dV}{d\theta} = \left(\frac{dH}{d\theta}\right) \frac{A}{a} R'$$

where:

$A$ = area of objective lens $\quad = \frac{\pi}{4} \times 1^2 = 0.78 \text{ cm.}^2$ $a$ = area of detector $\quad = .25 \text{ cm.}^2$ $$\frac{dV}{d\theta} = 0.63 \times \frac{0.78}{0.25} \times 0.18 = 0.36 \; \mu v$$

When using pairs of fields oriented 45° with the control axes, the slope is increased by $\sqrt{2}$ and will become 0.5 μv./degree. The actual value achieved will be diminished by the transmission of the lens and filter to about 0.4 μv./degree.

The signal available, 0.4 μv./degree, is sufficient as is shown above, and therefore with the values given the instrument of the present invention is capable of giving reliable results for a tilt of as little as 1°. This is adequate for the use to which the invention is to be put.

It is an important practical operating advantage of the present invention that for normal use the presence of the sun in the field of view of one detector does not introduce an error as great as the accuracy usually demanded of the instrument. This somewhat surprising result can be understood when it is realized that while the sun's radiance, even at the wavelength range in the infrared of the carbon dioxide band, is greater per unit area, the sun's image on the sensor detector is tiny in comparison with the field of view, all of which receives radiation from the carbon dioxide. The factor is approximately 1/1500. The following calculation shows the actual effect of the sun:

The radiation received on the detector (P) is proportional to the following product:

$$P \sim N\omega\tau$$

where:

$N$ = Radiance of source
$\omega$ = Angular subtense of source
$\tau$ = Transmission of intervening path.

The radiance of the sun in the 13.8–16.0μ spectral region is 0.15 watts/cm.²-ster. and its angular subtense is 0.2 square degree. The average upward transmission of the atmosphere from a 30K ft. altitude in this region is 0.25.

The radiance of the carbon dioxide in the atmosphere above 30K ft., assuming a temperature of 230° K. and emissivity of 1−.25=0.75, is 0.00038 watts/cm.²-ster. It fills the field of view of 10°×30° (300 square degrees) and since the sensor is immersed in the atmospheric $CO_2$ the intervening path length is zero and the transmission is unity.

The ratio of solar radiation on the detector to that from the atmospheric $CO_2$ is:

$$\frac{0.15 \times 0.2 \times 0.25}{0.00038 \times 300 \times 1} = 0.066$$

Thus the sun adds only 6.6% more radiation to the field in which it appears. This will produce a maximum error of 3.3% of the vertical field or about 1°. In other words, the maximum possible error is about the limit of accuracy of the instrument and does not interfere with its use under normal circumstances.

If in certain special circumstances it is felt necessary to eliminate any effect from the sun practically completely, then an auxiliary sun detector can be provided having sensitivity only in the short wavelength or visible spectral region, and which is connected to apply a correction factor to the output of the detector in whose field of view the sun may enter. The preferred and simplified modification of the present invention which does not eliminate completely any effect of the sun has important advantages from the standpoint of economy and simplicity, and is preferred.

It will be seen that the preferred form of the present invention, specifically described in FIGS. 4 and 5, is a purely passive horizon sensor of the radiation balance type. It has no moving parts, and utilizes standard types of infrared detectors and electronic circuits. The construction is very rugged and compact, the sensor 1 being a cylinder of 2.5 inches in diameter and about 2 inches long.

In FIG. 4, four sensors and four fields of view are shown, symmetrically dispersed with respect to one axis of the vehicle and the other to the other. It is of course possible to utilize one of the detectors as part of each sensor pair, as has been described in other types of radiation balance horizon sensors. It is necessary that there be at least three detectors with fields of view so that one pair is symmetrically disposed with respect to one axis and the other with respect to the other. The sensor is small enough and simple enough so that using four sensors as illustrated in the drawing adds little to the weight and permits some additional reliability by providing some redundancy. It was also chosen as an illustration as it brings out the principles of the present invention most simply and clearly.

While the present invention has been described particularly in conjunction with the preferred embodiment which relates to a radiation balance sensor, the principles of using a wider band which would have so long an absorption path when pointed toward or near the zenith that it would see space can be used with a scanning type sensor. For example, if in level flight the sensor conically scans a cone which is centered about the local vertical, the same general results would be obtained. That is to say, if the vehicle tilted, there would be a different response as the detector scanned across one end of an axis than the other, and an error signal would be produced, the direction of which (that is to say, tilt about roll or pitch axis) would be determined by the phase of the detector output signal and the amount of the tilt by the amplitude.

A scanning modification is illustrated in FIGS. 6 and 7 of the drawing. FIG. 6 is a diagrammatic representation with a single detector 20, imaging optics 21, a filter 22, and a rotating prism 23 which is rotated by the motor winding 24. The prism passes infrared radiation in the band chosen either side of the 15μ peak of emission for carbon dioxide, as shown in FIG. 3, and may, for example, be a germanium or silicon prism. A filter 22 is provided which passes the band and attenuates sharply on either side. The optics 21 of course has to be of suitable well-known material that passes infrared radiation in the band. The output of the detector 20 passes through a capacitor 24 into an amplifier 25, and conventional phase detector electronics 26 are used in conjunction with a reference signal generator 27 to put out an A.C. signal when the scan is on each of the orthogonal axes of pitch and roll. The general design of the scanning optics is substantially the same as that described in the Kaufman Pat. 3,118,063 referred to above, but instead of a scan looking down on the earth, a field of view 17 is scanned. It is of the same dimensions and has the same upward inclination from the horizontal as the fields of view in FIGS. 1–5. The local vertical is shown in solid lines when the airplane is in level flight, and the cone scanned by the field of view 17 is symmetrically centered on the local vertical. There is also shown in FIG. 6 an illustration of a tilted vehicle in which the local vertical is shown in dashed lines. The degree of tilt is measured by the double arrow. The diagrammatic illustration shows a very large degree of tilt in order to emphasize the operation of the invention.

FIG. 7 shows the amplifier output with respect to one axis. In the position where the vehicle is level, the output is D.C. which is not amplified, and is represented by the solid line of zero volts in FIG. 7. If there is a tilt, there will be an A.C. signal, one of which is shown in dashed lines in FIG. 7 for one axis. This A.C. signal passes through the capacitor 24 and is amplified. In other words, 24 and 25 represent a conventional A.C. amplifier. The magnitude of the tilt has been exaggerated so that a large A.C. signal is shown in FIG. 7.

In the preferred modification of the present invention, which uses a radiation balance local vertical sensor, it is normally desirable to determine departures about two orthogonal axes. This preferred form is that which has been specifically described, but of course the principles of the invention are equally applicable when there are only two sensors symmetrically disposed with respect to a single axis, and in a broader aspect this modification is also included.

The invention has been described in connection with particular band widths in the infrared. These require filters, which can be mounted in front of the thermopile or in front of the lenses. In fact, the lenses themselves may, under certain circumstances, form a portion of the filtering means. Since the filters used are of well-known types and are not changed by the present invention, they have not been shown in the drawings, in order to avoid confusion. For the same reason, a typical example of bands of various widths around 15μ carbon dioxide band have been described. It should be understood that the invention is also useful with other atmospheric constituents which have suitable absorption and emission bands. One such constituent is ozone, but it is less desirable than carbon dioxide because its concentration in the atmosphere is not constant.

What is claimed is:

1. A flying vehicle-local vertical sensor combination for sensing departure of the vehicle from a predetermined flight attitude about at least one axis at right angles to the local vertical, which may represent roll or pitch, comprising in combination
    (a) a flying vehicle having a local vertical sensing system mounted to look upwardly, from the top of the vehicle,
    (b) said sensing system comprising at least two sensors responsive to radiations from gaseous contituents of the atmosphere,
    (c) field of view forming means for said sensors tilting up somewhat from the horizontal and directed so that the sensors' fields of view are symmetrically disposed with respect to roll or pitch axes when the vehicle is in normal flight,
    (d) signals from the radiation detectors being connected in opposition for any pair, and
    (e) means for adjusting the sensitivity of the detectors to radiation bands of sufficient width symmetrically disposed about the wavelength of radiation maximum for the 15μ carbon dioxide band so that opacity for field of view looking toward the zenith is decreased whereby the response of radiation signal with zenith angle of the field of view forms a symmetrical curve with minimum at a zenith angle of zero, the steepness of the curve sides being sufficient to produce a differential signal when the pairs are tilted with respect to one or both roll and pitch axes, the band width of sensitivity of the detectors being greater than 14.3–15.4$\mu$ and less than that which sees the earth itself at moderate tilt.

2. A combination according to claim 1 in which there are at least three sensors symmetrically disposed about two orthogonal axes at right angles to the local vertical.

3. A combination according to claim 2 in which the radiation detectors are thermopiles.

4. A combination according to claim 2 in the form of a cylinder, the axis of which is parallel to the roll axis of the vehicle in level flight.

5. A combination according to claim 4 in which reflecting means are provided for causing fields of view from the detectors to cross each other for each pair.

6. A combination according to claim 2 in which the number of radiation detectors and fields of view is four, one pair being symmetrical to the roll axis and the other to the pitch axis.

7. A combination according to claim 4 in which the number of radiation detectors and fields of view is four, one pair being symmetrical to the roll axis and the other to the pitch axis.

References Cited
UNITED STATES PATENTS

| | | | |
|---|---|---|---|
| 3,118,063 | 1/1964 | Kaufman | 250—83.3I |
| 3,205,362 | 9/1965 | Dryden | 250—83.3I |
| 3,381,569 | 5/1968 | Hatcher | 250—83.3I |

WALTER STOLWEIN, Primary Examiner

M. J. FROME, Assistant Examiner

U.S. Cl. X.R.

250—203